Patented Aug. 1, 1933

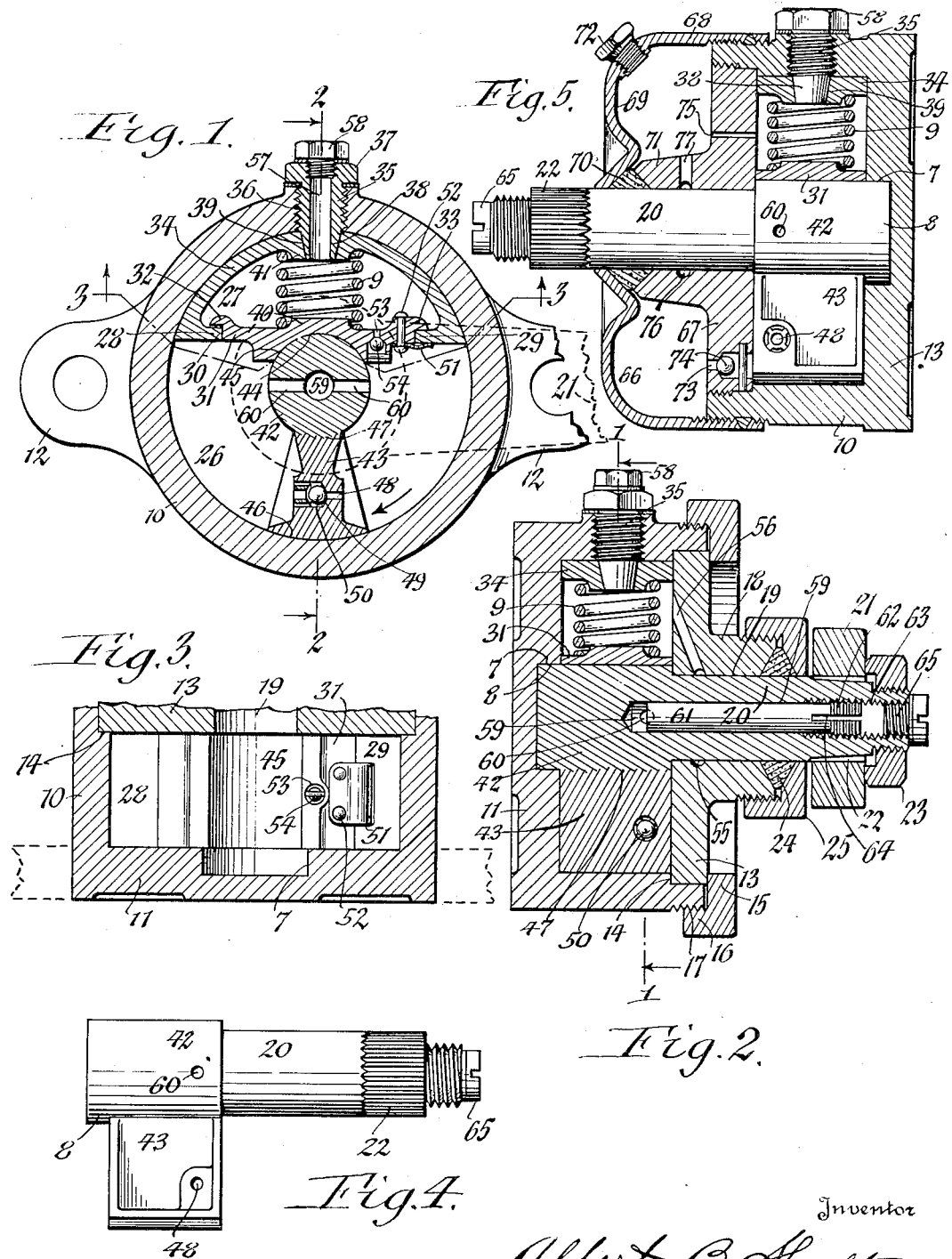

1,920,218

UNITED STATES PATENT OFFICE 1,920,218

SHOCK ABSORBER

Albert B. Shultz, Buffalo, N. Y., assignor to Houde Engineering Corporation, Buffalo, N. Y., a Corporation of New York Application December 15, 1930. Serial No. 502,280

14 Claims. (Cl. 188—89.)

This invention relates to a shock absorber of the hydraulic type in which a resistance liquid is forced by a piston from one end of a working chamber to the other and the passage through which the liquid is moved may be controlled to suit the particular shock absorbing capacity which is normally required.

It frequently occurs that a shock absorber is subjected suddenly to unusually heavy loads which far exceed the normal loads which are encountered within the limits of ordinary operation, and when such extraordinary loads are encountered a knocking effect is produced in the shock absorber due to the inability of displacing the resistance liquid sufficiently rapid at this time, thereby producing disagreeable riding qualities of the vehicle on which the shock absorber is installed.

Means have heretofore been provided which afford relief or unloading effect of the resistance liquid when encountering abnormally high loads on the absorber, but these means have usually been so constructed that they presented a comparatively small area for the operating parts and therefore necessitated a considerable movement of the respective parts in order to give the required relief, and this in turn produced an undesirable noisy operation when the relief means again closed.

It is the object of this invention to provide relief means for permitting resistance liquid of a hydraulic shock absorber to automatically unload under abnormally high shocks or loads, which relief means are so constructed that they provide a comparatively large area for the passage of the liquid resistance while subjected to excess loads, and thus permit movement of the resistance liquid during the unloading operation without producing any knocking or halting effect; and these relief means are also so organized that the same will close after the unloading effect without producing any noise.

A further object of this invention is to provide simple and efficient means for regulating the normal by-pass through which the resistance liquid flows from one end of the working chamber to the other during normal operation of the apparatus.

In the accompanying drawing:

Figure 1 is a vertical transverse section of a shock absorber embodying my improvements and taken on line 1—1 Fig. 2.

Figure 2 is a vertical longitudinal section of this shock absorber taken on line 2—2 Fig. 1.

Figure 3 is a fragmentary horizontal section taken on line 3—3 Fig. 1 looking upwardly.

Figure 4 is a side elevation of the piston, the rock shaft whereby the piston is operated, and part of the valve mechanism whereby the movement of resistance liquid through the by-pass is regulated.

Figure 5 is a vertical longitudinal section similar to Fig. 2 but showing a modified form of my invention.

In the following description similar characters of reference indicate like parts in the several figures of the drawing:

In its preferred form the body of the shock absorber, as shown in Figs. 1 and 2, comprises a circular or cylindrical wall 10, the rear end of which is closed by means of an integral head or wall 11, and this body is connected to one of the relatively movable members to which the shock absorber is applied for cushioning the shock or movement between the same.

Assuming that this shock absorber is to be interposed between the body or frame of an automobile and an axle which move relatively to one another, the body in this case would be provided on its opposite sides with attaching lugs 12 which are connected by bolts or the like with the frame or body of the car or automobile.

The front end of the cylindrical wall 10 is closed by a detachable front head 13 which bears against an internal rabbet or shoulder 14 on the front end of the wall 10 and is held thereagainst by an annular clamping ring which has an inwardly projecting flange 15 engaging with the front side of the front wall 13 and provided with a rearwardly projecting longitudinal flange 16 which is connected by means of a screw joint 17 with the periphery of the circular wall 10, as shown in Fig. 2.

The front wall 13 is provided with a forwardly projecting tubular neck or sleeve 18 which contains a central horizontal longitudinal bearing 19, the axis of which is concentric with the circular or cylindrical wall 10 of the body. Within this bearing 19 is journaled a rock shaft 20 the outer or front end of which has secured thereto a rock arm 21 which is adapted to be connected with the other relatively movable part, in this case the axle of the automobile which moves relatively to the body or frame of the same. The connection between this rock arm 21 and the shaft 20 is preferably effected by serrating the cooperating surfaces 22 thereof and holding these serrations in an interlocking engagement by means of a clamping nut 23 engaging with an external screw thread on the outer end of the shaft 20 and bearing against the front side of the rock arm 21, as shown in Fig. 2.

A leak-tight joint is produced between the shaft 20 and its bearing 19 by means of an annular packing 24 surrounding this shaft and held against the outer end of the neck 18 by means of a packing nut 25. The space within the circular or annular wall 10 of the body and the rear and front heads 11 and 13 thereof is divided in the present case into a lower working chamber 26 which is of comparatively large capacity, and an upper or relief chamber 27 of comparatively small capacity, which proportioning of these chambers is effected by arranging a partition wall tangentially and preferably horizontally across the space within the circular wall above the axis of this wall and the bearing 19 and shaft 20. This partition wall preferably comprises two end sections 28, 29 which extend tangentially inward from opposite sides of the bore of the cylindrical wall 10 and form a relief opening 30 between the opposing edges thereof, and a movable central section 31 which fits at its opposite longitudinal edges against the inner edges of the partition sections 28, 29, and is provided along the upper parts of its longitudinal edges with longitudinal flanges 32, 33 which overhang the upper sides of the end sections 28, 29 of this partition wall, as shown in Fig. 1.

The width of the end sections 28, 29 and the width of the movable central section 31 of this partition wall is equal to the distance between the rear and front walls of the working and relief chambers, but the end sections 28, 29 of this partition wall are fitted tightly against the rear and front walls of these chambers and the central section 31 is fitted between these front and rear chamber walls sufficiently loose to permit this central section to move freely under pressure for a purpose which will presently appear.

The two end sections 28, 29 of the partition wall are preferably formed integrally with a segmental connecting bar 34 which engages with the upper part of the bore of the circular wall 10 and is held against circumferential movement therein by means of a screw plug 35 engaging with a threaded opening 36 in the upper part of the circular wall 10 and provided at its outer end with a head 37 engaging with the outer side of this circular wall, while its inner end is provided with a conical stud 38 which engages with a correspondingly shaped opening 39 in the upper part of the segmental connecting bar 34.

The central section of the partition wall is yieldingly pressed downwardly toward the axis of the body by means which preferably consist of a spring 9 arranged in the relief chamber 27 and bearing at its lower end against the central section 31 of the partition wall, and its upper end against the connecting bar 34, said central section and the connecting bar being preferably provided on their opposing sides with bosses 40, 41 and entering opposite ends of the helical spring 9, as shown in Figs. 1 and 2, thereby holding the latter against displacement between these parts.

Within the working chamber is arranged an oscillating piston which turns concentrically with the axis of the cylindrical wall 10 and comprises a central hub 42 which is connected with the inner or rear end of the rock shaft 20, and a wing 43 extending laterally from the underside of the hub. The periphery 44 of the hub is of cylindrical form and bears against a correspondingly shaped seat 45 on the underside of the central partition section 31, and the outer or lower end 46 of the piston wing 43 is curved concentrically with the rock shaft and engages with the bore of the circular wall 10, as shown in Fig. 1. The hub and wing of this piston are preferably made of two separate pieces which are connected with each other by means of a welded joint 47, and these members are equal in width to the distance between the front and rear heads 13 and 11 of the working chamber so as to divide the latter into a high pressure end which in this case is at the left hand side of the piston shown in Fig. 1, and a low pressure end which in the present case is at the right hand side of the same in Fig. 1.

When this shock absorber is installed on an automobile and the body and axle of the same are moved away from each other, then the wing of the piston is moved in a direction opposite to the arrow associated with this wing in Fig. 1, at which time the resistance liquid within the working chamber is permitted to move with comparative freedom from the low pressure end of the working chamber to the high pressure end of the same through a check valve in the piston wing which opens at this time, said check valve being shown in Fig. 1 and consisting of a port 48 in this wing and having a seat 49 which faces the high pressure end of the working chamber and a ball valve 50 arranged in this port and adapted to move toward and from the seat 49.

During the high pressure stroke of the piston wing in which it moves toward the left hand end of the working chamber as the frame or body and the axle of the automobile separate, the ball check valve 50 engages the seat 49 and closes the port 48, thereby preventing the movement of resistance liquid through the piston wing, and instead confining the same within the high pressure end of the working chamber, and thereby causing the movement of the piston wing in this direction to be retarded or checked and the shock to which the automobile is subjected to be absorbed.

Some of the liquid, both during the high and low pressure strokes of the piston ring, is permitted to flow from one end of the working chamber to the other through a by-pass passage which is regulatable in accordance with the load which is to be imposed upon this shock absorber, which regulatable by-pass will be more fully described later.

During the normal operation of the apparatus the central section 31 of the partition wall bears with its concave bearing surface 45 against the convex bearing surface 44 of the piston hub, as shown in Fig. 1, so as to produce a practically tight joint between these parts at this time and prevent the passage of any resistance liquid therethrough from one end of the working chamber to the other.

If, however, the shock absorber is subjected to a sudden pressure or to an abnormally high load or shock, particularly during the rebound of the body relatively to the axle during which the piston wing moves toward the high pressure end of the working chamber, then the abnormal pressure to which the resistance liquid is subjected at this time in the high pressure end of the working chamber will cause the left hand end of the central partition section 31 to be lifted slightly. When this occurs a very narrow slit or passage way is formed between the cooperating curved surfaces 44 and 45 of the piston hub and the movable partition section 31 which establishes communication at this place between the opposite ends of the working chamber, and thus permits some of the resistance liquid to escape from the high pressure to the low pressure end of the working chamber in addition to that which is permitted to flow at this time through the regulatable by-pass. The relief passage for the added flow of resistance liquid which is formed at this time between the piston hub and the cooperating movable partition section 31 is not only of a very large area but also is of wedge or tapering form from the high pressure end of the working chamber toward the low pressure end of the same, so that the resistance liquid enters this abnormal relief passage gradually and assists in gradually lifting the movable partition section; and when the abnormal pressure thereafter subsides this large area of the abnormal relief passage between the piston hub and the central partition section together with the tapering form of the same also causes this partition section to again be lowered and resume its engagement with the piston hub gradually and easily and without producing any noise during this operation.

Moreover, by making this relief passage of comparatively large area the extent of lift of the central or relief section of the partition wall need only be very slight so that the subsequent movement of the same to its normal position in engagement with the piston hub is correspondingly slight, and thus further contributes to eliminating any noise in the operation of this relief valve mechanism at this time.

In order to prevent the right hand or low pressure end of the relief section 31 of the partition from having any vertical play relative to the adjacent fixed partition section or flange 29, but instead yieldingly engage the upper side thereof and operate in the manner of a hinge, a spring 51 having preferably the form of a curved leaf of spring metal is secured by means of a rivet 52 to the underside of the right hand end of the relief wall section 31, and the free end of this spring is engaged with the underside of the flange 29, as shown in Figs. 1 and 3. By this means the relief section 31 of the partition wall is always held yieldingly in engagement with the adjacent fixed section 29 of the partition wall, but free to turn thereon when the left hand end of this movable partition section is raised and lowered, thereby preventing any pressure in the right hand or low pressure end of the working chamber from lifting the corresponding end of the relief section of the partition wall and producing any chattering noise, and also insuring forming a wedge shaped relief passage between the piston hub and the movable relief wall when the latter is opened under abnormal pressure within the high pressure end of the working chamber.

Any resistance liquid which is forced under pressure from the working chamber past the joints between the partition wall sections 28, 29 and 31 enters the relief chamber 27, which latter operates also as a replenishing chamber from which resistance liquid is supplied to the working chamber whenever the latter requires an additional amount of this liquid.

In addition to other functions the flanges 32 and 33, by engaging with the upper side of the end partition sections 28, 29 prevent the lid or movable partition section 31 from becoming disengaged from these sections, and hold the same in an assembled position relatively to the sections 28, 29 and the cross bar 34 connecting the same, while under the pressure of the spring 9 as the shock absorber is being assembled and dismembered, thereby facilitating these operations.

The return of resistance liquid from the replenishing or relief chamber to the working chamber is preferably effected through a port 53 arranged in the low pressure end of the relief wall section 31, and extending from the replenishing or relief chamber 27 to the low pressure end of the working chamber, and provided with a check valve 54 which opens toward the low pressure end of the working chamber and closes toward the replenishing or relief chamber 27.

Any liquid which under pressure in the working chamber creeps forwardly or outwardly through the joint between the rock shaft 20 and the bearing 19 is intercepted in a collecting groove 55 formed in the bore of the bearing 19, and is conducted from thence into the upper part of the relief or replenishing chamber by means of a passage 56 extending from the upper part of the collecting groove 55 to said relief or replenishing chamber, as shown in Fig. 2.

Additional resistance liquid is supplied to the instrument by means of a feed opening 57 extending downwardly through the screw plug 35 into the upper part of the relief or replenishing chamber 27, which opening is normally closed by means of screw plug 58, as best shown in Fig. 1.

The means for regulating the flow of resistance liquid back and forth from one end of the working chamber to the other during the operation of the apparatus are constructed as follows:

The numeral 59 represents a valve chamber of cylindrical form extending from the front or outer end of the operating shaft to the front part of the hub of the piston and 60, 60 two ports leading from opposite sides of the inner or rear part of this valve chamber to the high and low pressure ends of the working chamber.

Within this valve chamber is arranged a cylindrical valve rod 61 which is adapted to be moved lengthwise in this chamber for causing its inner or rear end to cover or uncover the ports 60, 60 more or less and thus vary the freedom of flow of resistance liquid from one end of the working chamber to the other through the regulatable by-pass thus formed by the ports 60 and the valve chamber 59. The longitudinal movement of this regulating valve is preferably effected by providing the outer end of the same with an external screw thread 62 which engages with a corresponding internal thread 63 in the bore of the regulating valve chamber so that upon turning the regulating valve the same will be moved lengthwise and its inner end will expose more or less of the ports 60 and govern the flow of resistance liquid accordingly.

The turning of the regulating valve is preferably effected by means of a screw driver or similar instrument engaged with a transverse slot or notch 64 in the outer end thereof.

For the purpose of holding the regulating valve reliably in its adjusted position the slot 64 therein is made sufficiently long so that the parts on opposite sides of the slot may be spread apart before introducing the regulating valve in the valve chamber and thereby causing the spread parts of the regulating valve to frictionally engage the threads thereon with the adjacent threads of the regulating valve chamber and thus serve as a lock or retainer for holding this valve against accidental turning.

After the regulating valve has been adjusted the outer end of the valve chamber is preferably closed by a screw plug 65, as shown in Fig. 2, thereby excluding dirt from the same and also reducing the possibility of tampering with this valve.

In the preferred construction the hub of the piston is provided with a rearwardly extending pivot pin or trunnion 8 which is concentric with the hub and operating shaft, and is journaled in a bearing 7 in the inner side of the rear head 11 of the body, thereby supporting the piston on opposite sides and preventing the same from tilting but instead holding the same constantly in a true and correct position relative to the cooperating surfaces of the working chamber and causing the same to work without undue friction or wear.

If desired, my invention may be embodied in a shock absorber of modified form which is shown in Fig. 5 and which is provided with a replenishing chamber 66 which is formed between the front side of a front head 67 screwed into the front end of the cylindrical wall 10 and a cap having the rear end of its peripheral wall 68 screwed onto the wall 10 and the head 69 at the front end of said wall 68 pressing against a packing 70 interposed between the same and the front end of the bearing sleeve 71 on the front side of the intermediate head 67. This replenishing chamber 66 is supplied with resistance liquid through an opening in its top which is normally closed by a screw plug 72 and liquid is delivered from the lower end of the same to the lower end of the working chamber through a replenishing port 73 in the lower part of the head 67 which contains a check valve 74 opening toward the working chamber and closing toward the replenishing chamber 66.

Communication is established between the relief chamber 27 and the upper part of the replenishing chamber by a bleed opening 75 in the upper part of the head 67 so as to permit the movable section 31 of the partition to lift under pressure against its underside. Any resistance liquid which may flow forwardly between the operating shaft and the bearing sleeve 71 is caught by a collecting groove 76 in the bore of the sleeve 71 and conducted into the replenishing chamber 66 through a passage 77 in this sleeve.

In both forms of this invention a relief for the excess pressure in the working chamber under abnormal conditions is provided into which the relief passage is comparatively long and thin and of large area so that only a small extent of lift is required for disengaging the relief section of the partition from the rotor piston, thereby enabling this relief to be effected silently.

I claim as my invention:

1. A shock absorber comprising a body having a fixed wall provided with a curved bearing surface and a yielding wall forming parts of a working chamber adapted to contain a resistance liquid, said yielding wall having a curved bearing surface which is concentric with the curved surface of said fixed wall, and a piston oscillating in said chamber and having a wing, the outer end of which engages the surface of said fixed wall and a hub arranged at the inner end of said wing and having a curved surface engaging the curved bearing surface of said yielding wall.

2. A shock absorber comprising a circular wall, a tangential partition extending across said circular wall on one side of its center and dividing the space within the latter into a comparatively large working chamber adapted to contain resistance liquid for absorbing shock and a relatively small relief chamber adapted to contain a reserve supply of resistance liquid, said partition having a movable section provided with a bearing face curved concentrically with said circular wall, and a piston having a circular hub engaging with said bearing surface and a wing engaging with said circular wall.

3. A shock absorber comprising a circular wall, a frame within said circular wall on one side of its center and dividing the space within the latter into a comparatively large working chamber adapted to contain resistance liquid for absorbing shock and a relatively small relief chamber adapted to contain a reserve supply of resistance liquid, said frame having two end sections projecting inwardly from said wall and a yieldable central section arranged between said end sections and provided with a bearing surface, a screw secured to said wall and engaging said frame for holding the same in place, and a piston having a hub engaging said bearing surface and a wing engaging said wall.

4. A shock absorber comprising a circular wall, a tangential partition extending across said circular wall on one side of its center and dividing the space within the latter into a comparatively large working chamber adapted to contain resistance liquid for absorbing shock, and a relatively small relief chamber adapted to contain a reserve supply of resistance liquid, said partition having two end sections projecting inwardly from said wall and a movable central section arranged between said end sections and provided with a bearing surface, a spring interposed between said wall and movable partition section, and a piston having a hub engaging said bearing surface and a wing engaging said wall.

5. A shock absorber comprising a circular wall, a tangential partition extending across said circular wall on one side of its center and dividing the space within the latter into a comparatively large working chamber adapted to contain resistance liquid for absorbing shock and a relatively small relief chamber adapted to contain a reserve supply of resistance liquid, said partition having two end sections projecting inwardly from said wall and a movable section, said movable section being provided with a bearing face curved concentrically with said circular wall, and having a flange engaging one of said end sections, a spring secured to said movable partition section and engaging the underside of the partition end section which is engaged by said flange, and a piston having a hub engaging said bearing surface and a wing engaging said wall.

6. A shock absorber comprising a circular wall, a tangential partition extending across said circular wall on one side of its center and dividing the space within the latter into a comparatively large working chamber adapted to contain resistance liquid for absorbing shock and a relatively small relief chamber adapted to contain a reserve supply of resistance liquid, said partition having a movable section provided with a bearing face curved concentrically with said circular wall, a check valve arranged in said partition and opening toward said working chamber and closing toward said relief chamber, and a piston having a circular hub engaging with said bearing surface and a wing engaging with said circular wall.

7. A shock absorber comprising a circular wall, a frame within said circular wall on one side of its center and dividing the space within said wall into a comparatively large working chamber adapted to contain resistance liquid for absorbing shock and a relatively small relief chamber adapted to contain a reserve supply of resistance liquid, said frame having two end sections projecting inwardly from said wall and a central section arranged between said end sections and provided with a bearing surface, a screw secured to said wall and engaging said frame for holding the same in place, said screw having a filling passage therethrough and a plug for closing said passage, and a piston having a hub engaging said bearing surface and a wing engaging said wall.

8. A shock absorber comprising a circular wall, a tangential wall extending across said circular wall above the axis thereof and dividing the same into a lower working chamber and an upper relief chamber, said tangential wall having a movable section adapted to open under pressure in the working chamber, front and rear heads for said chambers, a bearing sleeve extending forwardly from said front head and provided in its bore with a liquid collecting groove, said front head having a return passage leading from said collecting groove to said relief chamber, a shaft journaled in said bearing sleeve, and a piston arranged in the working chamber and having a hub connected with said shaft and engaging said movable partition section and a wing projecting radially from said hub and engaging said circular wall.

9. A shock absorber comprising a circular wall, a tangential wall extending across said circular wall above the axis thereof and dividing the same into a lower working chamber and an upper relief chamber, said tangential wall having a movable section adapted to open under pressure in the working chamber, front and rear heads for said chambers, a bearing sleeve extending forwardly from said front head and provided in its bore with a liquid collecting groove, a replenishing chamber arranged in front of said front head, said sleeve provided with a liquid return passage extending from said collecting groove to said replenishing chamber, a liquid replenishing passage connecting the lower ends of said replenishing chamber and working chamber and formed in said front head, a check valve arranged in said replenishing passage and opening toward said working chamber and closing toward said replenishing chamber, a bleed passage arranged in said front head and connecting said relief chamber with the upper part of said replenishing chamber, a shaft journaled in said sleeve, and a piston arranged within the working chamber and having a hub connected with said shaft and engaging said tangential wall, and a wing extending radially from said hub and engaging said circular wall.

10. A hydraulic shock absorber comprising a circular wall, a partition within said wall dividing the space therein into a working chamber and a relief chamber, a piston structure having a hub concentric with said circular wall and a wing engaging with said circular wall, said piston structure dividing said working chamber into a low pressure side and a high pressure side, said partition having a movable section provided with a bearing face concentric with and receiving said piston structure hub, said movable section being hinged to said partition at the low pressure side of said working chamber, and a spring interposed between said circular wall and said partition movable section and tending to hold said section against said piston structure hub whereby to resist the swing of said movable section by the pressure of the high pressure side of said working chamber, swing of said movable section opening a path between said section and said hub for the escape of fluid from the high pressure side to the low pressure side of the working chamber during operation of the shock absorber.

11. A hydraulic shock absorber comprising a circular wall, a partition extending across said wall and dividing the space therein into a working chamber and a relief chamber for resistant fluid, a piston structure comprising a cylindrical hub concentric with said circular wall and a wing extending from said hub into engagement with said circular wall, said piston structure and said partition dividing said working chamber into a high pressure side and a low pressure side, the section of said partition above said piston structure hub being movable and hinged to said partition at the low pressure side of the working chamber and having a bearing face for said piston structure hub, a spring interposed between said circular wall and said movable section of said partition for resisting swing of said movable section away from said hub by the pressure in the high pressure side of the working chamber, said movable section being swung by the pressure in said high pressure side to open a relief path for the flow of fluid from the high pressure side to the low pressure side for the flow of fluid, said movable section responding to excessive pressure to establish communication between said high pressure side and said relief chamber, and a check valve operable to return fluid from the relief chamber to the low pressure side of the working chamber.

12. A hydraulic shock absorber comprising a circular wall, a partition extending across said wall to divide the space therein into a working chamber and a relief chamber for resistant fluid, a piston structure comprising a cylindrical hub and a wing extending therefrom into bearing engagement with said circular wall, said piston structure and partition dividing said working chamber into a high pressure side and a low pressure side, a main relief passageway for the relief of fluid from the high pressure side to the low pressure side of the working chamber, said partition having a passageway and a movable section extending across said passageway to form a closure therefore and hinged to said partition at the low pressure side of the working chamber, said movable section having a bearing face receiving the piston structure hub, a spring tending to hold said movable section against the piston hub and to close said passageway through the partition, abnormal pressure in said high pressure side causing swing of said movable section to open an auxiliary relief path between said section and said piston structure hub for the flow of fluid from the high pressure side to the low pressure side of the working chamber, and excessive pressure in said high pressure side causing sufficient movement of said movable section to open said passageway for the flow of fluid from the high pressure side into the relief chamber, and a check valve controlling the flow of fluid from said relief chamber to the low pressure side of the working chamber.

13. A hydraulic shock absorber comprising a casing for containing resistance fluid, a piston structure within said casing having a hub and a wing extending therefrom into engagement with the casing wall, a cross wall in said casing, said cross wall and piston structure dividing said casing into a high pressure side and a low pressure side, said cross wall having a movable section, a spring tending to hold said movable section intimately against the hub of the piston structure but yieldable to permit movement of said movable section away from said hub to form a relief path for the flow of fluid from said high pressure side to the low pressure side during operation of the shock absorber.

14. A hydraulic shock absorber comprising a casing for containing resistance fluid, a piston structure within said casing having a hub and a wing extending therefrom into engagement with the casing wall, a frame seated within said casing at one side of said hub and defining a relief chamber, said frame and piston structure defining a high pressure chamber and a low pressure chamber, said frame having a relief port for flow of fluid from the high pressure chamber to the relief chamber, said frame having a movable section forming a valve for said relief port, a spring tending to hold said valve to close said relief port and to engage intimately against the hub of the piston structure but yielding to permit movement of said valve to open said relief port and to form a relief pass for the flow of fluid from the high pressure chamber to the low pressure chamber during operation of the shock absorber.

ALBERT B. SHULTZ.